Jan. 20, 1970 P. HUET 3,491,324
ELECTROMECHANICAL TRANSDUCER
Filed March 20, 1968 2 Sheets-Sheet 1
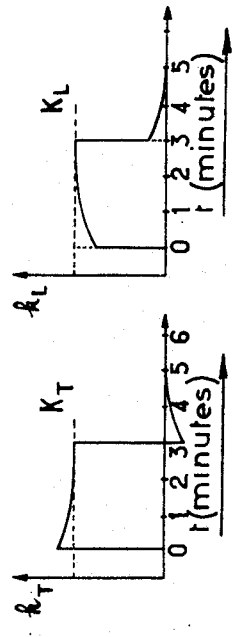
FIG.2
FIG.3
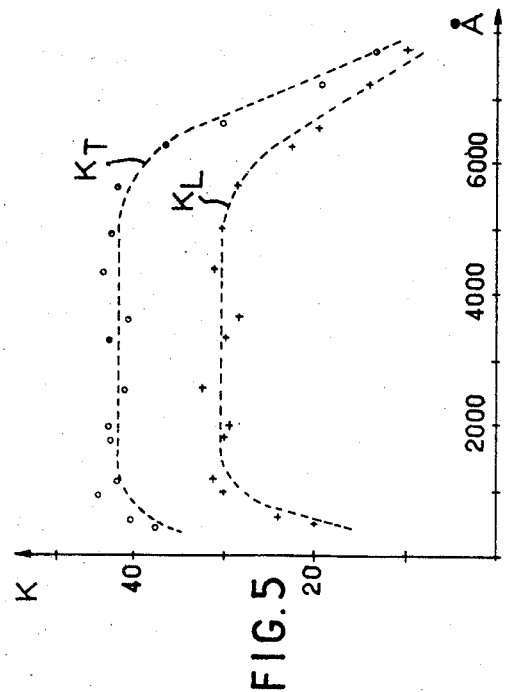
FIG.5
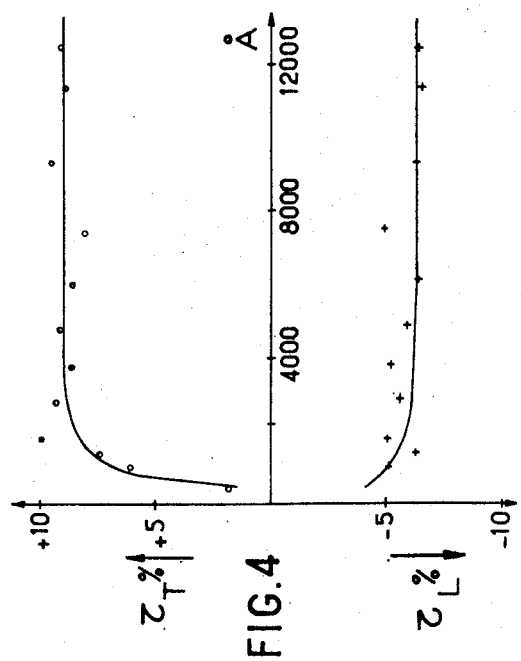
FIG.4
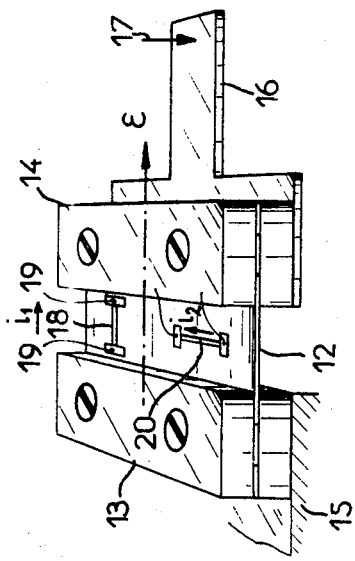
FIG.1
Inventor:
Pierre Huet
By, Spencer & Kaye
Attorney

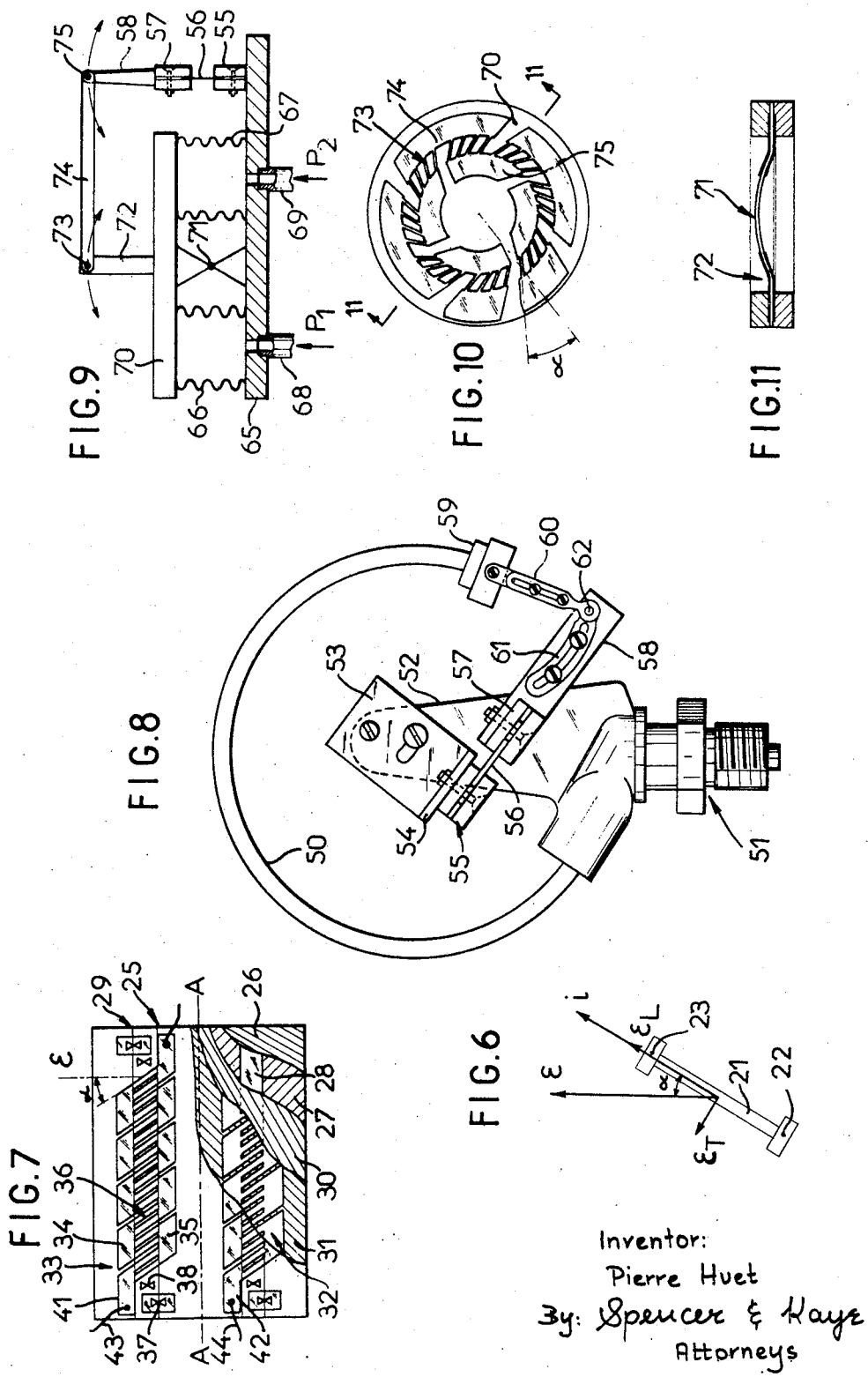

United States Patent Office 3,491,324
Patented Jan. 20, 1970

3,491,324
ELECTROMECHANICAL TRANSDUCER
Pierre Huet, 51 Rue Thiers, 76 Bolbec, France
Filed Mar. 20, 1968, Ser. No. 714,600
Claims priority, application Great Britain, Mar. 21, 1967,
13,269/67
Int. Cl. G01l 1/22
U.S. Cl. 338—2   11 Claims

ABSTRACT OF THE DISCLOSURE

An electromechanical transducer utilizing variations in the electrical resistance of a strip of material as its length changes, the transducer including an element presenting at least one zone which is deformable in a first direction, a thin conductive layer in the form of an elongated band disposed on the zone so as to extend in a second direction, and means for causing electrical current to flow through the elongated band, the second direction being inclined with respect to the first direction by an angle which is determined by the longitudinal and transverse effects of the physical deformation of the band on its electrical resistance values.

BACKGROUND OF THE INVENTION

The present invention relates to electromechanical transducers, and particularly to transducers of the strain gauge type in which the electrical resistance of an element varies as a function of the degree of deformation to which it is subjected.

The invention is particularly concerned with transducers of this type utilizing thin conductive layers, particularly of bismuth, deposited by vacuum deposition on insulating supports.

It is well known that if such a layer is subjected to a tension force which elongates the layer in a given direction, its electrical resistance in that direction will be altered.

In my copending U.S. application Ser. No. 603,269, filed on Dec. 20, 1966, I disclose an advantageous technique for utilizing the effect of such a deformation on the resistance of the layer in a direction transverse to the deformation.

Experience has shown, however, that when such a thin layer is subjected to a deformation, its electrical resistance does not change to a corresponding value in an instantaneous manner. Rather, a contrary tendency is exhibited in that its resistance slowly approaches a stable value. This phenomenon is known as relaxation and is due to the elastoresistance of the thin conductive layer.

Although this phenomenon does not create any serious problems if the frequency at which the deformation to be measured varies within certain ranges, such phenomenon does create serious problems when certain types of deformations are to be measured, particularly when the frequency of variation of deformations to be measured is in a certain range.

SUMMARY OF THE INVENTION

It is a primary object of the present invention to eliminate these drawbacks and difficulties.

Another object of the invention is to eliminate the adverse effects of relaxation on the measurement produced by such transducers.

Yet another object of the invention is to render the accuracy of such transducers independent of the frequency of the deformation variations to be measured.

These and other objects according to the invention are achieved by the provision of an electromechanical transducer element including a deformable member having a surface at least one zone of which is deformable in one preferential direction, at least one thin, elongated, conductive layer disposed on this zone so as to extend in a second direction, and being connected to the layer for producing an electric current flow therethrough in such second direction. The thin conductive layer is made of such a material that the electrical resistance of the layer will vary as a function of physical deformation imparted thereto, and the layer presents elastoresistance relaxation ratios $\tau_L$ and $\tau_T$ corresponding to the relaxation effects occurring therein in directions parallel and perpendicular, respectively, to the directions of deformation thereof and steady state elastoresistance coefficients $K_L$ and $K_T$ corresponding to the variations in its resistance in directions parallel and perpendicular, respectively, to the direction of deformation thereof. In accordance with a principal feature of the invention, the second direction forms with the preferential direction an angle which is substantially equal to arc $$tn\sqrt{\frac{-\tau_L \cdot K_L}{\tau_T \cdot K_T}}$$

BRIEF DESCRIPTION OF THE DRAWINGS

FIGURE 1 is a perspective view of a test device used for determining the elastoresistance coefficients of a thin layer.

FIGURE 2 is a graph used in explaining the principles of the present invention.

FIGURE 3 is a graph similar to that of FIGURE 2 also used in explaining the principles of the present invention.

FIGURE 4 is a graph illustrating certain properties of the layers to be employed in the practice of the present invention.

FIGURE 5 is a graph showing certain other properties of the layers to be used in embodiments of the present invention.

FIGURE 6 is a vector diagram used to explain the principles of the present invention.

FIGURE 7 is a plan view, partly in cross section, of one embodiment of the present invention.

FIGURE 8 is an elevation view of a device employing an embodiment of the present invention.

FIGURE 9 is an elevational view illustrating another device employing an embodiment of the present invention.

FIGURE 10 is a plan view of another embodiment of the invention.

FIGURE 11 is a cross-sectional elevational view taken along the line 11—11 of FIGURE 10.

DESCRIPTION OF THE PREFERRED EMBODIMENTS

Basically, the present invention takes advantage of the fact that the longitudinal resistance variation due to the relaxation phenomenon is opposite in sign from the transverse resistance variation due to this phenomenon, while the two resistance values approach their stable state exponentially with respect to time, the exponential variations of the two resistance values having the same time constant.

I have discovered that this permits the achievement of a compensation of the relaxation effects by an appropriate combination of the two elastoresistance variations and by depositing thin layers of a suitable material on a structure which is deformable in one direction, referred to as the preferential direction, and by giving a particular orientation to the thin layers with respect to this preferential direction.

Before it is possible to construct devices according to the present invention wherein the undesirable effects of relaxation are eliminated, it is first necessary to determine the elastoresistance values for the thin layers to be employed.

FIGURE 1 shows a test device which has been used for the basic study of the elastoresistance of thin layers of bismuth deposited by vapor deposition in a vacuum on insulating supports of various materials such as mica, Mylar or Kapton.

The device is essentially composed of a plate 12 made of stainless steel and having an elongated form. The plate is clamped tightly along its two long sides between respective pairs of heavy jaws 13 and 14, jaws 13 being rigidly attached to a stationary support 15, while jaws 14 are rigidly connected to a lever arm 16.

The rigidity of the jaws renders the elongation of the plate in the direction of its longitudinal axis substantially impossible. When the arm 16 is displaced in the direction of arrow 17, the median portion of the plate 12 experiences a cylindrical flexure.

The support for the thin test layers is cemented to this median portion of the plate 12. These layers can thus be subjected, in the plane which they define, to a unidirectional deformation oriented in the preferential direction indicated by the arrow $\epsilon$ oriented perpendicularly to the long axis of the plate.

The thin conductive layers on which tests were carried out were in the form of rectangles 1 mm. wide and 15 mm. long.

In a first series of measurements, the layers were disposed in the manner indicated at 18 in such a way that the measuring current $i_1$ traversing these layers between two connection regions 19 was parallel to the direction $\epsilon$. By measuring the variations in the resistance of each layer both before and after the deformation, it is possible to determine the elastoresistance $(\Delta R/R)_L$ corresponding to the longitudinal effect. This enables a determination to be made of the value of the steady state longitudinal coefficient of elastoresistance:

$$K_L = \frac{(\Delta R/R)_L}{E}$$

where E represents the relative elongation of the test layer.

In a second series of measurements, thin layers obtained by the same process are arranged in positions as shown at 20 so that the measuring current $i_2$ traversing them is perpendicular to the deformation direction $\epsilon$. The resulting measurements permit the determination of an elastoresistance $(\Delta R/R)_T$ corresponding to the transverse effect. This permits a determination to be made of the steady state transverse elastoresistance coefficient:

$$K_T = \frac{(\Delta R/R)_T}{E}$$

With the aid of the simple experimental structure of FIGURE 1, it has been possible to detect and measure the relaxation phenomena which result from the fact that when a thin layer is submitted to a deformation, the variation in its electrical resistance is not, in general, instantaneous, but rather slowly approaches an equilibrium state, the difference between the initial value and the equilibrium value often being relatively large. These phenomena are difficult to observe in the ordinary extensometric units where, in general, elongations occur in two principal directions.

When a thin bismuth layer has applied to it deformations whose value varies as a function of time in the manner of a square wave, it is possible to observe, in the case of deformations perpedicular to the measuring current, a transverse elastoresistance phenomenon whose variations as a function of time are represented in FIGURE 2. Similarly, in the case of deformations parallel to the measuring current, it is possible to observe a longitudinal elastoresistance phenomenon whose variations as a function of time are represented in FIGURE 3.

In the case of transverse elastoresistance effects, as shown in FIGURE 2, it can be observed that the transverse elastoresistance coefficient $k_T$ has the following form:

$$k_T = K_T + k'_T \exp(-t/\theta) \quad (1)$$

that is to say, that the instantaneous coefficient $k_T$ is a combination of an exponential value having a coefficient $k'_T$ and a steady state coefficient $K_T$, and that the value of $k_T$ asymptotically approaches the values $K_T$. The ratio between $k'_T$ and $K_T$ is referred to as the transverse relaxation ratio and has the equation:

$$\tau_T = \frac{k'_T}{K_T} \quad (2)$$

Thus $K_T$ is the coefficient relating the change in resistance of the strip 20 for a given change in the strain applied to the strip in the direction $\epsilon$ if the strain variations are sufficiently slow to permit the resistance to reach an equilibrium state corresponding to the steady state coefficient value. On the other hand, $k'_T$ is the transverse elastoresistance coefficient due to the relaxation effect.

FIGURE 3 depicts the variations in the longitudinal elastoresistance coefficient $k_L$ as a function of time for strips having the orientation of the strip 18 of FIGURE 1. It may be seen that the value of this coefficient approaches a steady state coefficient value $K_L$ in an asymptotic manner, $K_L$ being comparable to $K_T$. The coefficient $k_L$ may thus be represented as follows:

$$k_L = K_L + k'_L \exp(-t/\theta) \quad (3)$$

where $k'_L$ is the coefficient of the exponential elastoresistance component due to relaxation. The longitudinal relaxation ratio is then represented by:

$$\tau_L = \frac{k'_L}{K_L} \quad (4)$$

Investigations were then carried out on the variations of these relaxation ratios $\tau_T$ and $\tau_L$ for thin layers of bismuth disposed on a Kapton support as a function of the thickness of these layers. The results obtained are shown in FIGURE 4.

It is first noted that the longitudinal and transverse relaxation ratios have respectively opposite signs, regardless of the thickness of the bismuth layer. In other words, if $\tau_T$ is considered to have a positive sign, then $\tau_L$ has a negative sign and, therefore, $k'_T$ has a positive sign while $k'_L$ has a negative sign.

It was then noted from the curve of FIGURE 4 that as the thickness of the bismuth layer, which is represented on the abscissa of the chart, increases, the ratios increase relatively rapidly until a thickness of the order of 2000 A. is reached. Then, these ratios become stable for increasing thicknesses, with $\tau_L$ stabilizing at a value of about $-6\%$ and $\tau_T$ stabilizing at a value of about $9\%$.

When Mylar is used as a support, the rate of change of these ratios is comparable to that shown in FIGURE 4, but these ratios reach stable values of the order of $-10\%$ and $+11.5\%$, respectively.

Finally, when the support is of mica, the curves for the corresponding ratios again have the same shapes, but the ratios reach stable values of the order of $-40\%$ and $+80\%$, respectively.

It has also been determined that it is possible to reduce the values of the levels which these ratios attain by heating the support to a temperature of the order of 100° C. during the deposition of each layer. When layers are deposited on Kapton in this manner, the stable values which the ratios attain are of the order of $-4\%$ and $+6\%$, respectively, while for mica these values are of the order of $-10\%$ and $+10\%$, respectively. It was not possible to proceed in this manner when Mylar supports were used because this material can not withstand temperatures beyond 80° C.

Subsequently, a study was made of the variations in the values of the steady state coefficients $K_L$ and $K_T$ for thin bismuth layers as a function of the thickness of these layers. This investigation was effectuated using layers deposited at ambient temperature on Kapton, Mylar and mica. The investigation was then carried out on layers which had been deposited on mica and Kapton supports while they were maintained at a temperature of 100° C. during the deposition process.

FIGURE 5 is a graph showing the variations in these coefficients as a function of the thickness of the layers deposited on Kapton at ambient temperature. It may be noted that the two coefficients increase with increasing layer thickness until a thickness value of around 1000 A. is reached, the coefficient values then remain constant as the thickness increases until the thickness reaches a value of the order of 5500 A., and then decrease as the thickness increases beyond that value.

Substantially the same results were obtained when the supports were of mica and Mylar. The average maximum values for these coefficients, over the range where they are substantially constant, for layers deposited on various supports are as follows:

| Coefficients | Supports | | |
|---|---|---|---|
| | Kapton | Mica | Mylar |
| $K_L$ | 30 | 30 | 29 |
| $K_T$ | 42 | 41 | 37 |

When the support is maintained at a temperature of 100° C. during the deposition of the layer by vaporization, the values for these coefficients remain substantially the same but they remain constant as the layer thicknesses are increased up to the greatest thickness studied, which was of the order of 13,000 A. The average maximum values for the constant portions of the coefficient curves were then $K_L=34$ and $K_T=45$ when the support was of Kapton, and $K_L=33$ and $K_T=43$ when the support is of mica.

It might be mentioned that the various thickness values discussed above were determined by weighing, it being recognized that the density of bismuth when in the form of a thin layer has the same value as when the bismuth is in its usual solid state.

Starting from the fact that the longitudinal and transverse relaxation ratios, $\tau_L$ and $\tau_T$ have respectively opposite signs, and that the time constants of the exponential terms of Equations 1 and 3 above are identical, I have discovered that it is possible to nullify the influence of the relaxation effect, which effect leads to substantial inaccuracies in many types of strain measurements, by an appropriate association of the longitudinal and transverse elastoresistance phenomena.

I have discovered that this desirable result can be achieved by employing a unidirectionally deformable structure, of the type exemplified by the device of FIGURE 1, and by depositing thin conductive layers in such a manner that the electrical measuring current flows therethrough in a direction which forms a certain angle with the deformation direction.

The manner in which the desired orientation for the layers is arrived at may be explained with the aid of the diagram of FIGURE 6 where a thin conductive strip 21 is disposed between two connecting terminals 22 and 23 and is oriented so that the direction in which the current $j$ flows through the strip 21 is inclined with respect to the deformation direction $\epsilon$ of the support (not shown) at a certain angle $\alpha$.

The standard calculations employed in the field of extensometry show that in this case the deformation $\epsilon$ is equivalent to the sum of the two following deformations:

$\epsilon_L = \epsilon \cos^2 \alpha$ in the direction $i$, and $\epsilon_T = \epsilon \sin^2 \alpha$ in the direction perpendicular to $i$.

The observed effect of elongation strains in the direction $\epsilon$ on the resistance of the strip 21 between the terminals 22 and 23 is then the sum of the longitudinal effect due to the first one of the above deformations and of the transverse effect due to the second one of the above deformations. It is thus possible to find a particular value for the angle $\alpha$ which permits an elimination of the relaxation effect.

Taking into consideration Equations 1 and 3 above, above, it can be noted that variations in the resistance of the strip as a function of deformations in the direction $\epsilon$ can be represented by the following equation:

$$\frac{\Delta R}{R} = K_T \epsilon \sin^2 \alpha + K_L \epsilon \cos^2 \alpha + (k'_T \epsilon \sin^2 \alpha + k'_L \epsilon \cos^2 \alpha) \exp(-t/\theta) \quad (5)$$

The exponential time function of this relation will be eliminated when the angle $\alpha$ has the value given by the following equation:

$$\alpha = \text{Arc } tg \sqrt{-\frac{\tau_L}{\tau_T} \cdot \frac{K_L}{K_T}} \quad (6)$$

The values for the relaxation ratios and the coefficients K being, as has been seen, practically constant for conductive layer thickness of between 2000 and 5500 A., it would be advantageous to select a thickness value which is between these limits. Based on the measured values for the relaxation ratios (as represented in FIGURE 4) and the coefficients K (as shown in FIGURE 5), Equation 6 yields a value of $\alpha=34°$ for bismuth layers having a thickness of between 2000 and 5500 A. and deposited on a Kapton support, and $\alpha=40°$ for the same layers deposited on a Mylar support.

The values thus calculated are in perfect agreement with experimental verifications which have been carried out for various values of the angle $\alpha$. A series of verifications was carried out in particular with bismuth layers having a thickness of 3800 A. and deposited on a support of Kapton. A second series of verifications was carried out with comparable layers deposited on a Mylar support.

A nearly perfect compensation of the relaxation effects was obtained with an inclination of 34° in the first case and an inclination of 40° in the second case. These values are relatively critical, experiments having shown that a variation of only a few degrees causes the appearance of a predominance of one or the other of the transverse and longitudinal relaxation effects.

In the discussion thus far presented, the deformations of the layer in the direction perpendicular to the support, that is to say the "normal" effect, has been ignored. It is sufficient to note that in the experiments carried out, this normal deformation ($\epsilon_Z$) could occur freely. It is under these conditions that it was possible to develop practical embodiments, several examples of which will be described in detail below.

One embodiment of the invention has been developed, employing a deformable structure of the type described above with reference to FIGURE 1, in the form of an electromechanical transducer which can be utilized as a displacement detector in various types of manometers.

FIGURE 7 shows one embodiment of a transducer element according to the invention which could be mounted on a deformable plate similar to the plate 12 of FIGURE 1. The transducer element of FIGURE 7 is produced by first depositing on a support sheet 25, made of Kapton, for example, a continuous layer 26 of bismuth which extends across the entire surface of sheet 25 and which is deposited by vapor deposition in a vacuum. In a second operation period, a layer 27 of nickel is deposited on the layer 26, the layer 27 extending over the entire surface of the support except for the regions defined by two longitudinal bands 28 and 29 which, in order to prevent the deposition of nickel thereon, are temporarily covered with a suitable mask.

In a third operation the entire surface is coated with a layer 30 of a photosensitive varnish, this being, for example, of the type sold under the tradename Resifax by the Kodak Co. This material is normally soluble in solvents such as trichloroethylene and becomes insoluble when it has been subjected to ultraviolet radiation.

In a fourth step the surface thus treated is covered with a photographic negative 31 which carries, on a black or opaque background, the design for two conductive layer structures each of which is to be disposed on a respective face of the deformable plate on which the transducer is to be mounted. These designs are in the form of two transparent images 32 and 33.

Each of these designs is composed of a series of connecting bands or zones such as 34 and 35 disposed alternatingly to one side and the other of the bands 28 and 29 on which no nickel coating has been deposited. Across the bands 28 and 29 the transparent design presents a series of narrow zones 36 which define the thin active layers and which are inclined at an angle $\alpha$ with respect to the deformation direction $\epsilon$.

The particular design shown in FIGURE 7, which is presented only by way of example, results in a series arrangement of pairs of parallel conductive layers, it being understood that any other manner of grouping the individual layers could be employed, depending on the requirements of the particular device in which the transducers are to be used.

The fabrication of the transducer is then continued by illuminating the surface containing the photographic negative with ultraviolet light and by then immersing the support in a solvent such as trichloroethylene. This causes a dissolution of all of the deposits effectuated with the exception of the zones which were protected by the irradiated portions of the photosensitive layer, i.e., the portions defined by the designs 32 and 33.

The arrangement shown also includes reference regions 37 and 38 which serve to facilitate the positioning of the structure.

The arrangement thus produced is cut in half along the median A—A and the two resulting portions are attached, by cementing or bonding for example, on respectively opposite faces of the deformable plate on which the transducer is to be employed.

After the application of a protective insulating varnish the plate thus equipped is taken and clamped between two pairs of jaws comparable to the jaws 13 and 14 of FIGURE 1, these jaws covering the connection zones 34 and 35 with the exception of the end portions such as 41 and 42, where the nickel substrate 27 permits the connection, by ordinary soldering, of lead wires such as the wires 43 and 44.

The two series of active layers 36 thus present at the opposed faces of the plate are submitted, when the plate is subjected to deformation flexures, to strain in respectively opposite directions and, as a consequence, can be electrically connected together to form one half of a bridge circuit.

FIGURE 8 shows one arrangement in which such electromechanical transducer could be employed as the displacement sensor in a Bourdon tube manometer. In this device, a Bourdon tube 50 has one end attached to a connector 51 to which is also connected a base plate 52. On this plate is attached, by suitable screws, a base 53, having the form of an angle iron. To the leg 54 of this base is bolted the pair of fixed jaws 55 which clamp one side of a plate 56 made of stainless steel and comparable to the plate 12 of the device of FIGURE 1. On each surface of the plate 56 is cemented or bonded a respective one of the two components described in detail with reference to FIGURE 7.

A pair of movable jaws 57 are rigidly connected to a movable arm 58 and are arranged to tightly clamp the other edge of the plate 56. The arm 58 is coupled to the movable extremity 59 of the tube 50, this coupling being effectuated at an articulation axis 62, through the intermediary of a coupling rod 60 having an adjustable length and an adjustable slide 61 having a curved slot through which pass the screws or bolts by which the slide 61 is attached to the arm 58.

By varying the position of this slide with respect to arm 58, it is possible to adjust the sensitivity of the device by modifying the effective length of the lever arm producing the flexure of plate 56. In addition, by adjusting the length of the coupling rod 60, a regulation of the zero setting of the apparatus can be effectuated.

Such an apparatus has been constructed with a Bourdon tube 50 which produces at its extremity 59 a displacement of the order of 20 mm. for a pressure change of 1 bar. The detector 56, when having the form of construction described above and having its two sensing elements connected as one half of a bridge circuit which is provided with a supply voltage of 10 volts, and when the effective length of the lever arm to the articulation axis 62 was equal to 50 mm., produced a voltage differential of 50 millivolts per millimeter of displacement of the articulation axis.

In order to protect the detector from unduly large dust formations, mechanical, abutments (not shown) are preferably provided in order to limit the displacement of the axis 62 to a range of 3 mm. Thus, using transducers according to the invention, it is possible to produce an electromechanical manometer delivering a voltage differential of 1 millivolt per millibar over a range of $\pm$ 150 millibars, and output of the device was found to be linear between $+0.6\%$ and $-0.6\%$. The resulting performance is, moreover, highly satisfactory in that it is obtained in a manometer which is capable of sustaining, without experiencing any damage whatsoever, pressures of the order of a bar.

FIGURE 9 shows another pressure-sensing device employing the present invention wherein the elements 55, 56, 57 and 58 are identical with the similarly-numbered elements shown in FIGURE 8. The device of FIGURE 9 is a type of differential manometer including a stationary and rigid base 65 on which are disposed two bellows membranes 66 and 67 connected by respective tubes 68 and 69 to two sources of fluid at pressures P1 and P2, respectively. A rigid beam 70 connected to the movable ends of the bellows 66 and 67 is mounted to pivot about a stationary axis 71 and carries an arm 72 at the free end of which is provided an axis 73 to which one end of a connecting rod 74 is pivotally connected. The other end of rod 74 is pivotally connected at axis 75 to the end of the arm 58 carrying the movable jaws 57.

In operation, the pivot point 73 is subjected to pivoting movement about the axis 71 by an amount which is proprotional to the difference between the two pressures P1 and P2. These movements of the pivot point 73 produce comparable pivoting movements of the axis 75 and it is these latter movements which determine the degree of flexure of the plate 56 and, hence, which are detected and converted into an electrical output signal proportional to variations produced in the resistances of the thin conductive layers on plate 56.

It may be noted that electromechanical transducers of the type described above can be used as displacement detectors in a wide variety of devices, particularly in manometric devices. The active elastoresistant element is never exposed to the fluid whose pressure is being measured. Any one of these devices could be readily provided with mechanical abutments whenever desired.

Turning now to FIGURES 10 and 11, there is shown another device employing transducers according to the invention for detecting pressures, displacements, or vibrations, the device being of the type having a membrane, devices of this type having been described in detail in my previously-mentioned co-pending application.

The device illustrated is composed essentially of a membrane 70 having a central portion 71 which is stamped to have the form of a portion of a sphere and a peripheral portion 72 having the form of a flat annulus.

The conductive element whose deformation is to be measured is deposited on the peripheral portion 72 in the form of thin layers 73 between two connection zones 74 and 75, one element being on each side of the membrane.

In this embodiment also, the peripheral portion 72 defines a zone which is deformable in one preferential direction which is, in the present case, in radial directions from the center of the membrane. It is, in effect, these radial deformations which are predominant in the region on which the thin layers 73 are disposed and such deformations are in respectively opposite directions, i.e., of respectively opposite signs, on the two opposed faces of the membrane, provided that the membrane is relatively thin. It is with respect to the radial direction that each of the active layers 73 is inclined at an angle $\alpha$ whose value is selected in the manner described above for the purpose of showing a complete elimination of the relaxation effect.

I claim:

1. An electromechanical transducer element comprising, in combination:
   a deformable member having a surface at least one zone of which is deformable in one preferential direction;
   at least one thin, elongated, conductive layer disposed on said zone so as to extend in a second direction, said layer being made of such a material that the electrical resistance of the layer will vary as a function of physical deformation imparted thereto; and
   means connected to said layer for producing an electric current flow therethrough in such second direction;
   wherein said layer presents elastoresistance relaxation ratios $\tau_L$ and $\tau_T$ corresponding to the relaxation effects occurring therein in directions parallel and perpendicular, respectively, to the direction of deformation thereof and steady state elastoresistance coefficients $K_L$ and $K_T$ corresponding to the variations in its resistance in directions parallel and perpendicular, respectively, to the direction of deformation thereof; and
   wherein said second direction forms with said preferential direction an angle which is substantially equal to arc $$tn \sqrt{\frac{-\tau_L}{\tau_T} \cdot \frac{K_L}{K_T}}$$

2. An arrangement as defined in claim 1 wherein said deformable member comprises an elongated rectangular plate whose long edges are tightly gripped and wherein said preferential direction is perpendicular to said long edges.

3. An arrangement as defined in claim 1 wherein said deformable member comprises a circular membrane whose periphery is tightly held, said deformable zone is constituted by the annular region of said membrane which is immediately adjacent said peripheral portion which is tightly held, and said preferential direction is constituted by the radial direction of the circle defined by said membrane.

4. An arrangement as defined in claim 1 wherein the material from which said conductive layer is made is bismuth.

5. An arrangement as defined in claim 4 wherein said layer has a thickness of between 2000 and 5500 A.

6. An arrangement as defined in claim 5 further comprising a support made of Kapton on which said layer is deposited, and wherein the angle between said second direction and said preferential direction has a value of approximately 34°.

7. An arrangement as defined in claim 5 further comprising a support of Mylar on which said layer is deposited, and wherein the angle between said second direction and said preferential direction has a value of approximately 40°.

8. An arrangement as defined in claim 1 wherein said member is in the form of a flat plate and wherein there are at least two conductive layers, said arrangement further comprising two support sheets on each of which is deposited, by vapor deposition, a respective one of said layers, each of said sheets being bonded to one surface of said deformable member.

9. An arrangement as defined in claim 8 wherein there is a plurality of conductive layers on each said sheet and said layers on said two sheets are electrically connected together to define one half of an electrical bridge.

10. An arrangement as defined in claim 1 wherein said conductive layer is deposited, by vaporization, directly on said zone.

11. An arrangment as defined in claim 1 wherein said electromechanical transducer element is formed by vacuum-depositing said thin conductive layer of an elastoresistant material on said deformable support and then heating the resulting assembly to a temperature of approximately 100° C.

References Cited

UNITED STATES PATENTS

| | | | |
|---|---|---|---|
| 2,403,951 | 7/1946 | Ruge | 73—88.5 |
| 3,278,881 | 10/1966 | Anderson et al. | 338—2 |
| 3,314,034 | 4/1967 | Caris | 338—2 |

OTHER REFERENCES

A. W. Rankin: "Orientation of Strain Gages in Stress Analysis," General Electric Review, September 1947, pp. 14–22.

RODNEY D. BENNETT, JR., Primary Examiner

HERBERT C. WAMSLEY, Assistant Examiner

U.S. Cl. X.R.

29—620; 73—88.5; 338—5